Figure 5:
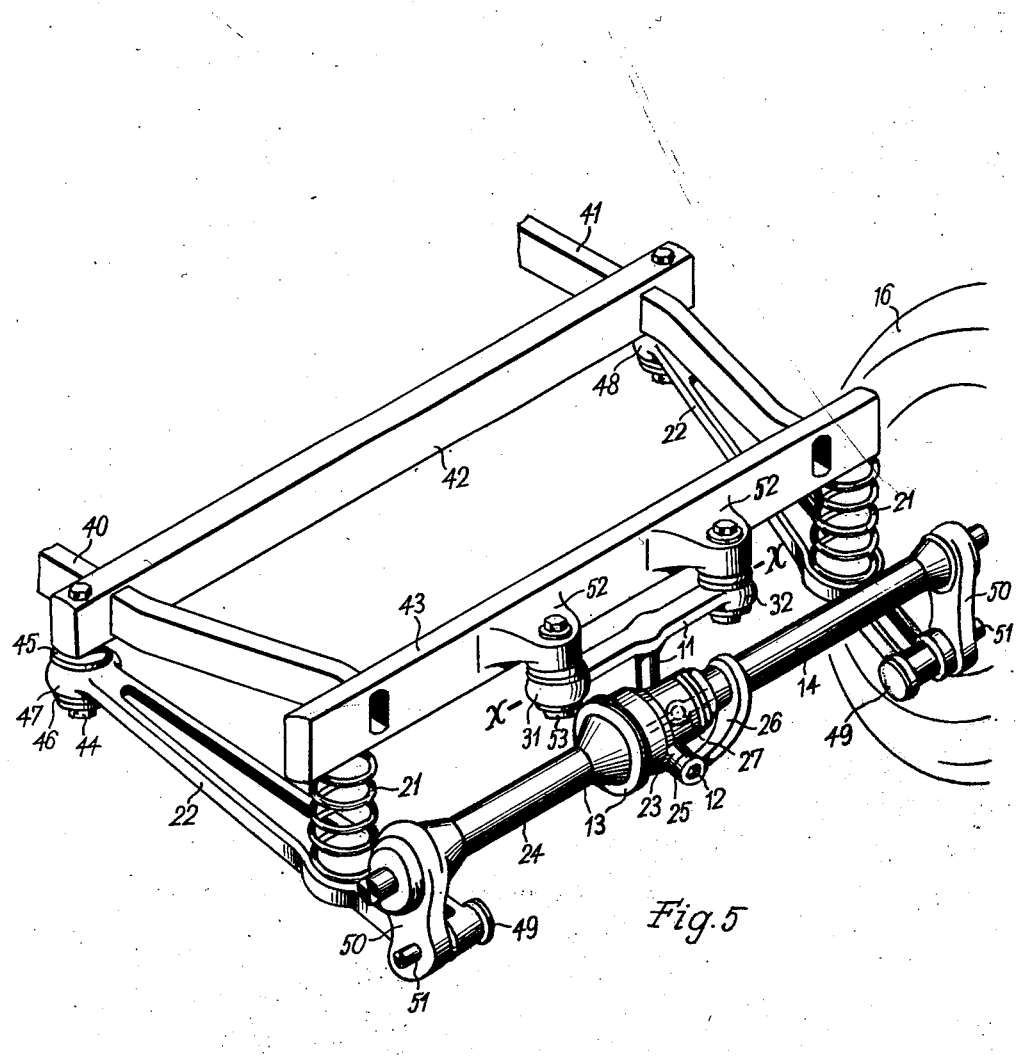

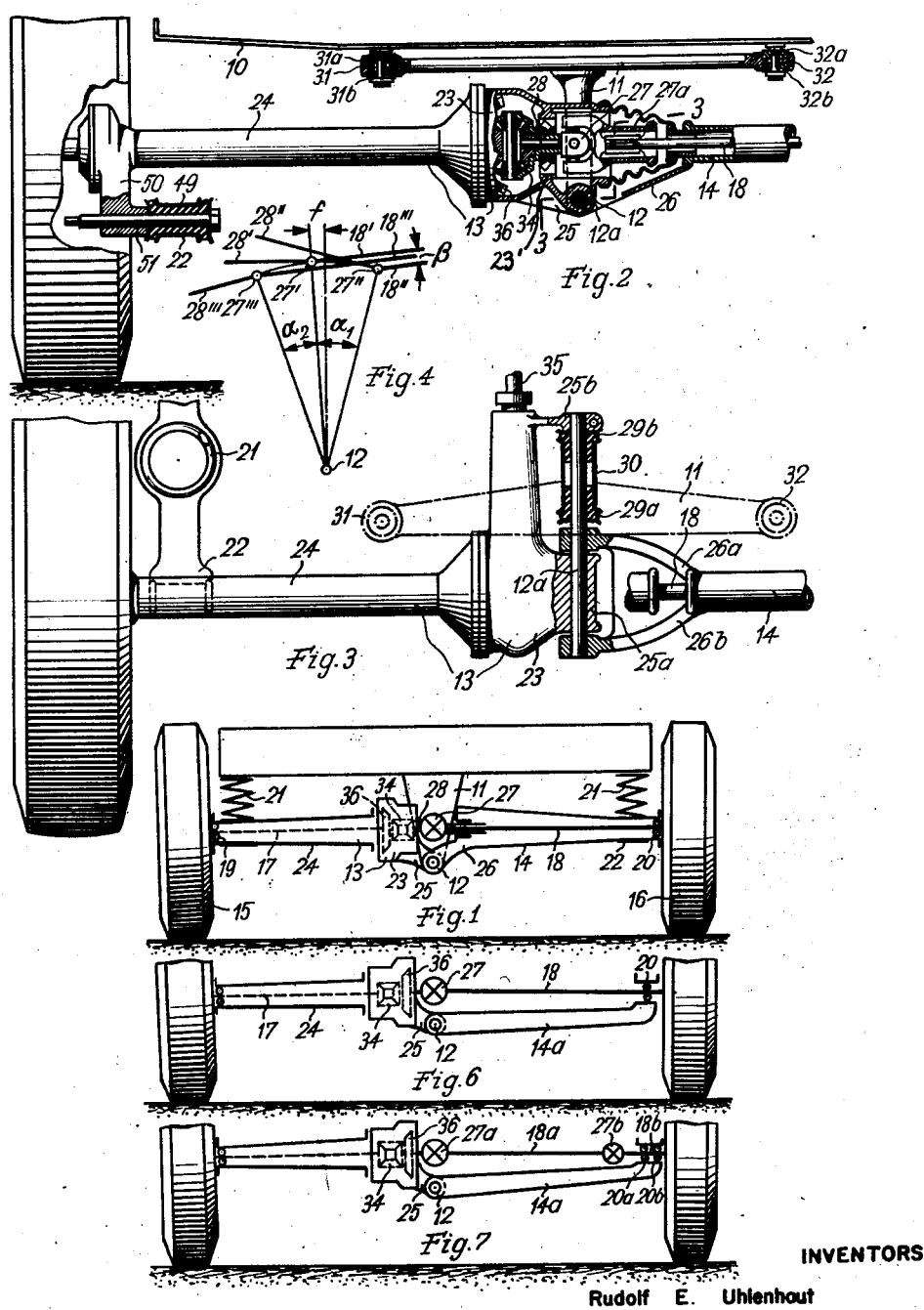

INVENTORS
Rudolf E. Uhlenhaut
Josef Müller
Hans O. Scherenberg

United States Patent Office 2,818,128
Patented Dec. 31, 1957

2,818,128

AXLE SUSPENSION SYSTEM FOR MOTOR VEHICLES

Rudolf E. Uhlenhaut and Josef Müller, Stuttgart, and Hans O. Scherenberg, Stuttgart-Heumaden, Germany, assignors to Daimler-Benz Aktiengesellschaft, Stuttgart-Untertürkheim, Germany Application November 15, 1954, Serial No. 468,976

Claims priority, application Germany November 14, 1953

20 Claims. (Cl. 180—73)

This invention relates to an axle suspension system for motor vehicles with so-called jointed cross-shaft axles which together with the road wheels swing about a central joint, and more particularly to such an axle suspension carrying driven wheels.

One of the objects of the present invention is to provide a most simple construction for such an axle suspension system which is capable to get along with a relatively small number of simple and ruggedly constructed parts, in particular joints.

Another object of the present invention is such a linking arrangement of the half axles that optimum roadability of the vehicle is obtained.

A further object of the present invention is the provision of such a pivotal arrangement of the half axles on the axle carrier that variation in tread will be as small as possible in the up and downward motion of the half axles.

Outstanding features of the present invention reside in that—

(a) both half axles are suspended on a common central joint on the frame or body of the vehicle, (b) the common, central joint is arranged lower than the wheel centers, whereas the drive shafts for the road wheels, which are arranged at the same level as the wheel centers, are preferably connected together by a driving joint located approximately vertically above the half-axle joint, (c) the axle drive gearing for driving the wheel driving shafts is incorporated in one of the two half axles, so that it together with the same and with the appertaining road wheel swings about the common half-axle joint located at a lower point.

By the employment of a single joint for both half axles, in contrast to constructions with separate lateral joints, the number of joints is reduced, on the one hand, and the length of the half axles increased, on the other hand. The latter effects that less variation in tread will be caused in the up and downward motions of the vehicle.

This favorable action is still further improved in that the common pivotal point is located lower than the wheel centers, so that, as in this case the radii of the swinging movement of the points of contact between tire and road surface approach the horizontal plane, the points of contact perform almost perpendicular motions in relation to the road surface upon the occurrence of the upward and downward motion of the road wheels. Variation in tread can therefore be limited to a minimum, notwithstanding the employment of jointed cross-shaft axles.

By reason of the fact that the axle drive gearing forms a part of one of the two half axles, the wheel drive is also simplified in that only a single driving joint need be provided which is arranged nearly vertically above the common joint of the two half axles. At the same time, the incorporation of the axle drive in one of the two half axles renders possible the elimination of relatively complicated guiding means for the jointed half axle or driving shafts within the axle drive housing, as would otherwise be necessary at the point of intersection of the axle centers when the axle drive is arranged on the vehicle frame as well as especially in the case where the half-axle joint is located outside of the axle center.

A further object of the present invention is to provide an axle suspension system having especially advantageous kinematic relations as well as a most advantageous transmission of the forces from the road wheels to the frame and vehicle body respectively by the employment of lateral radius arms as well as by the flexible linking of the half axles to the frame or vehicle body.

A still further object of the invention is to provide an axle suspension system in which the jointed half axles are so supported on the frame or vehicle body that with unequal up and down motions of the road wheels there will be very little deviation of the same from a straight course, despite the simultaneous employment of radius arms.

To this end a further feature of the invention resides in that an axle bracket for carrying the common half-axle joint is flexibly mounted on the frame or vehicle body above the wheel centers, whereas the half axles are, in the direction of travel, preferably supported by means of radius arms hinged thereto below the wheels centers, and the axle bracket, which carries the half axles by means of hinge-joints, is flexibly or pivotally connected to the frame or vehicle body about an axis fixed by two flexible suspension points above the wheel centers and located transversely to the direction of travel. Thus, seen in side elevation of the vehicle, the axle bracket together with the half axles hinged to it by hinge-joints forms a third side of a triangle, the two other sides of which are formed by the frame and the radius arms. By the low location of the pivotal point between radius arm and half axles, on the one hand, and by the high location of the axle bracket on the frame or vehicle body, on the other hand, this third side of the triangle obtains, specifically also with the upward and downward motions of the half axles, a relatively great length, whereby rotary motions about the axis are reduced and the shearing forces and twisting moments respectively about a transverse axis of the vehicle are particularly effectively taken up.

Further objects of the present invention are concerned with the simple and practical construction of the half axles in connection with a common joint located at a lower point, or an axle drive incorporated in one of the half axles as well as with the driving means for driving the road wheels.

Thus, a particularly advantageous form of the present invention is characterized by having the fulcrum of the driving joint, which is arranged above the common half-axle joint and permits the driving members to swing above a longitudinal axis of the vehicle, arranged so as to be displaced by a small amount towards the side of one of the two drive shafts in relation to the vertical longitudinal plane of the vehicle.

The novel features which are characteristic for the invention are set forth in particular in the appended claims. The invention itself, however, both as to its construction and operation, together with additional objects and advantages thereof, will be best understood from the following description of specific embodiments when read in connection with the accompanying drawings, in which:

Fig. 1 is a diagrammatic view of the jointed cross-shaft axle suspension with single-joint drive shaft provided by the invention, Fig. 2 is a fragmentary, partly sectional elevational view of one constructional embodiment of the design of Fig. 1, Fig. 3 is a fragmentary, partly sectional top plan view of the structure of Fig. 2 taken in the plane 3—3 thereof, Fig. 4 is a diagram explaining the suspension system, Fig. 5 is a perspective view of the jointed cross-shaft axle suspension shown in Fig. 2, Fig. 6 is a diagrammatic view of another embodiment of the invention with jointed cross-shaft axle and single-joint drive shaft, and Fig. 7 shows another embodiment of the invention with double-joint drive shaft in diagrammatic view.

In Fig. 1 the numeral 10 indicates a frame which has mounted thereon by means of a bracket 11 and a common joint 12 jointed half axles 13 and 14. Road wheels 15, 16 are driven by drive shafts 17 and 18 respectively extending within the tubular half axles 13, 14 and supported therein, for example, by ball bearings 19 and 20 respectively. Coil springs 21 or other suitable springs, which have the function of springing the jointed half axles, are mounted between the frame 10 and the radius arms 22. The jointed half axle 13 consists of an axle drive housing 23 and a tubular housing 24 which surrounds the drive shaft 17. The half axle is supported in the joint 12 by means of an arm 25.

Similarly the half axle 14 surrounds the drive shaft 18 essentially throughout the entire length thereof and is pivotally connected by the joint 12 to the bracket 11 by means of a downwardly directed arm 26. A joint 27, which in the projection upon a transverse plane of the vehicle, is arranged vertically above the joint 12, connects the drive shaft 28 of the differential suitably arranged and journalled in the housing 23, for example, in the inwardly projecting bearing portions 23', with the drive shaft 18 within the half axle 14.

In the constructional embodiment according to Figs. 2 and 3, the joint 12 surrounds a fulcrum pin 12a, which is supported by means of rubber buffers 29a and 29b in the sleeve-like eye 30 of the bracket 11. The latter is attached to the frame 10 at either side of the central longitudinal plane of the vehicle at two points 31, 32, rubber buffers 31a, b and 32a, b being interposed, so that the bracket member 11 may move about a transverse axis extending through the points 31 and 32.

The jointed half axle 13 with the axle drive 23 is mounted on the fulcrum pin 12a by means of the bearing eyes 25a and 25b which surround the eye 30 of the bracket 11 at either side. The half axle 14, which does not comprise the axle drive housing, is provided with a yoke integrally formed by the two arms 26a and 26b which are mounted on the fulcrum pin 12a at either side of the bearing eye 25a. The joint 12 may be arranged in the vertical central longitudinal plane of the vehicle or, for example, also in such manner that the vertical central longitudinal plane of the vehicle runs between the common fulcrum pin and the central longitudinal axis of the axle drive gearing.

The joint portion 27a is slidingly arranged on the drive shaft 18. In this connection it is to be noted that the center of the joint 27 in the mid-position of the wheels shown in the drawing, is not exactly perpendicular above the fulcrum point of the joint 12, but laterally displaced relative thereto by a small distance, as is indicated in Fig. 4 on an enlarged scale by the distance $f$ of the center in the position 27' thereof. It is thereby rendered possible that the half axles may perform different up and down motions, for example, relative to each other altogether an angle $\alpha1$ during the upward motion of both half axles and an angle $\alpha2$ during the downward motion thereof. If 27' is the center of the joint 27 in the center line 28' of the drive shaft 28 and with it in the center line of the half axle 13 invariably coincident therewith in the normal rest position of the wheels, the center line of the drive shaft 18 in the half axle 14 shall then be indicated by 18'. If the half axle 13 and hence the drive shaft 28 swings upwardly through the angle $\alpha1$ about the fulcrum point 12 relative to the right-hand wheel assumed to be fixed, the center of the joint 27 will then be moved to 27'' and with it the center line of the drive shaft 28, respectively of the half axle 13, moved to 28'', whereby the center line of the drive shaft 18 will be swung into the position 18'' when the outer bearing 20 is stationary. On the downward swing of the left-hand half axle 13 with the drive shaft 28 about the angle $\alpha2$ into the position 28''' of its center line, the center of the joint 27 will be moved to 27''' and the center line of the drive shaft 18 to 18'''. Thus it will be seen that in a complete springing movement of the wheels the shaft 18 must assume the inclined position indicated by the angle $\beta$. In order that the variation from a normal mid-position will be as small as possible, it will be appropriate to hinge the half axle 14 in such a manner at 12, respectively to dimension it in such a manner that its center line will be coincident with a mean mid-position of the drive shaft axis, hence, for example, approximately with the position 18''' of the center line of the drive shaft 18.

The axle drive gearing 34 located in the housing 23 is driven by a Cardan shaft 35 which, for example, is driven through a transmission from the engine of the vehicle, and which on its part drives the axle-drive gearing through a longitudinal drive shaft and an axle-drive bevel wheel 36, which in the embodiment according to Figs. 1 and 2 is arranged on that side of the axle-drive gearing located oppositely to the joint 27. This arrangement of the axle-drive bevel wheel results in the advantage that the axle drive gearing and therewith also the longitudinal drive shaft 35 can be moved closer to the joint 27, so that it performs smaller swinging motions in relation to the frame or vehicle body.

Fig. 5 shows a perspective view of the axle suspension on the frame 10. The latter comprises by way of example side rails 40, 41 and cross members 42 and 43. The radius arms 22 are hinged, for example, by means of a vertical pin 44 and each two annular rubber buffers 45, 46 at the ends of the cross member 42 to the fulcrum points 47 and 48, so that they are capable to yield universally in relation to the frame, whereas the other end of the arm 22 is attached by means of a rubber sleeve 49 and a pin 51 to a downwardly directed arm 50 of the half axle 13 or 14 (Fig. 2). The springs 21 are mounted at each side between the arms 22 and the frame cross members 43, whilst the axle carrier or bracket 11 is flexibly mounted at 31 and 32 by pins 53 to lateral mountings 52.

If, for example, one of the road wheels, for example, the left-hand wheel 15 performs a springing motion, it then swings about a straight line which connects the joints 47 and 12. In this connection it will be noted that the interposition of flexible members prevents jamming of the axle members, the jointed half axles connected together by the hinge-joint 12 being thus able to yield in conformity with the radius arms 22 as an entirety about a transverse axis $x-x$ fixed by the points 31 and 32. Any motions of the road wheels deviating from a straight course of the vehicle are thus reduced to a minimum.

In the form of the invention according to Fig. 6 the half axle surrounding the drive shaft 18 is dispensed with and an axle member 14a employed instead, which extends essentially throughout its entire length below the drive shaft 18 and is only joggled at its outermost end for accommodating the bearing 20 for the drive shaft or for the wheel 16. In this case the axle-drive bevel wheel 36 is by way of example arranged between the differential 34 and the joint 27 which permits among other advantages a more compact construction.

It stands to reason that the one or the other arrangement of the axle-drive bevel wheel may be employed in the form of the invention according to Fig. 1 as well as in that according to Fig. 6. The left-hand half axle may also be formed similarly to the right-hand half axle 14a, in that instead of using the tubular member 24 which surrounds the drive shaft 17, an axle member is provided which extends below the drive shaft.

The form of the invention according to Fig. 7 distinguishes itself from that according to Fig. 4 by the fact that it is provided with a double-joint drive shaft 18a in place of the single-joint drive shaft, and this shaft 18a is connected to the differential by means of a driving joint 27a, and by means of a joint 27b to the drive shaft 18b which drives the wheel 16 directly.

The drive shaft 18b is untiltably supported by means of bearings 20a and 20b on the outermost end of the jointed half axle 14a.

Moreover, all that which applies to the above described embodiments applies in an analogous way also to Fig. 7. The arrangement may in particular be such a one that both half axles are in conformity with each other formed, for example, either as tubular members surrounding the drive shafts, or as axle members extending transversely to the direction of travel of the vehicle, and the differential or axle drive gearing being incorporated in one of the two half axles.

What we claim is:

1. An axle suspension system comprising an axle bracket connected with the vehicle superstructure, two road wheels located oppositely to each other on different sides of the vehicle, two half axles each extending from an inner end to an outer end in the transverse direction of the vehicle, means for supporting one each of said two road wheels on the outer end of each of said two half axles, means providing only a single pivotal connection enabling essentially only movement about the pivotal axis thereof for hinging the inner end of each of said two half axles to said axle bracket with a common fulcrum for both of said half axles extending in the direction of travel of the vehicle, said fulcrum being located lower than the axis of rotation of said two road wheels, an axle drive gearing incorporated in one of said two half axles independently of said axle bracket, and means for driving said two road wheels from said axle drive gearing.

2. An axle suspension system according to claim 1 in combination with elastic means located above the axis of rotation of said two road wheels by means of which said axle bracket is flexibly connected to said vehicle superstructure.

3. An axle suspension system according to claim 2, wherein said axle bracket extends in the transverse direction of the vehicle, and said last mentioned means comprises elastic buffers arranged in the transverse direction of the vehicle in spaced relation to each other for connecting said axle bracket with said vehicle superstructure at either side of the central longitudinal plane of the vehicle.

4. An axle suspension system according to claim 2, wherein said means for connecting the inner ends of said half axles with said axle bracket also comprise elastic means.

5. An axle suspension system according to claim 1, wherein said means for hinging the inner ends of said half axles comprise two spaced arms, the arms of said half axle incorporating said axle drive gearing being arranged adjacent said axle drive gearing, said hinging means further comprising a fulcrum pin extending through said arms, and means for mounting the fulcrum pin on said axle bracket such that said last-mentioned hinging means are displaced in longitudinal direction of the vehicle in relation to the vertical transverse plane of the vehicle containing the half axles.

6. An axle suspension system according to claim 1, wherein said common fulcrum and said axle drive gearing are arranged with respect to each other essentially on opposite sides of the vertical central longitudinal plane of the vehicle.

7. An axle suspension system according to claim 1, wherein said last mentioned means comprises two drive shafts of which one each drives one of said two road wheels and one of which is driven directly from said axle drive gearing, and a driving joint located essentially vertically above said fulcrum and connecting said axle drive gearing with the other one of said two drive shafts, the center of said driving joint about which said drive shafts swing with respect to each other during movement of said half axles being displaced in relation to a vertical longitudinal plane passing through said common fulcrum by a small amount toward the side of said axle drive gearing.

8. An axle suspension system according to claim 1, wherein said last mentioned means comprise two drive shafts of which one each drives one of said road wheels and one of which is driven directly from said axle drive gearing, a driving joint located essentially vertically above said fulcrum and connecting said axle drive gearing with the other one of said two drive shafts, means for supporting said one of said two drive shafts in its appertaining half axle adjacent to said driving joint, means for supporting said other one of said two drive shafts in its appertaining half axle but only adjacent to the wheel, wherein said driving joint comprises two parts of which one each is turnably connected with one each of said two drive shafts and means for connecting said two parts to enable relative swinging motions of said two drive shafts about an axis extending in the driving direction of the vehicle, said last-mentioned axis being displaced in relation to a vertical longitudinal plane passing through said common fulcrum of said half axles in the normal rest position of the road wheels by a certain amount toward the particular side on which said first mentioned drive shaft is supported adjacent to said driving joint.

9. An axle suspension system according to claim 1, wherein said half axle incorporating said axle drive gearing is of tubular form and encloses the driving means appertaining thereto, the driving means including a drive shaft appertaining to said other half axle being located essentially outside of and spaced from said other half axle.

10. An axle suspension system according to claim 9, wherein said driving means comprise a central driving joint which connects the driving means appertaining to said half axle incorporating said axle drive gearing with the driving means appertaining to said other half axle, a shaft member for directly driving the road wheel appertaining to said last mentioned half axle, a driving joint for driving said shaft member, and an intermediate shaft which connects said two driving joints with each other, and wherein said means for supporting said last mentioned road wheel on said half axle further comprise bearing means by which said shaft member is untiltably supported on the outer end of said half axle.

11. An axle suspension system according to claim 1, wherein said driving means includes a central driving joint for connecting the road wheel supported on the particular half axle in which the axle drive gearing is not incorporated with said axle drive gearing, a drive shaft connecting said driving joint directly with said last-mentioned road wheel so that said drive shaft takes part in the swinging motions of the road wheel in the springing motions thereof, and wherein said means for supporting said last mentioned road wheel on the outer end of the appertaining half axle further comprise a single bearing by means of which said drive shaft is supported on the outer end of said half axle.

12. An axle suspension system according to claim 1 with means extending in the longitudinal direction of the vehicle for driving said axle drive gearing from the power source of the vehicle, wherein said axle drive gearing comprises a bevel-drive pinion arranged coaxially with said last mentioned driving means and a bevel-drive gear arranged on a transverse axis of said axle drive gearing, and said bevel-drive gear being arranged on that side of said axle drive gearing located adjacent to the particular half axle in which the axle drive gearing is not incorporated.

13. An axle suspension system according to claim 1 with means extending in the longitudinal direction of the vehicle and adapted for driving said axle drive gearing from the power source of the vehicle, wherein said axle drive gearing comprises a bevel-drive pinion arranged axially to said last mentioned driving means and a bevel-drive gear arranged on a transverse axis of said axle drive gearing, and said bevel-drive gear being arranged on that side of said axle drive gearing located oppositely to the particular half axle in which the axle drive gearing is not incorporated.

14. An axle suspension system of a motor vehicle comprising an axle bracket connected with the vehicle superstructure, two road wheels located oppositely to each other on different sides of the vehicle, two half axles each extending from an inner end to an outer end in the transverse direction of the vehicle, means for supporting one each of said two road wheels on the outer end of each of said two half axles, means forming only a single pivotal joint enabling essentially only pivotal movement about the pivot axis thereof for hinging the inner end of each of said two half axles to said axle bracket with a common fulcrum extending in the direction of travel of the vehicle, said fulcrum being located lower than the axis of rotation of said two road wheels, two radius arms on either side of the vehicle, hinge means for hingedly connecting one each of said two radius arms to each of said two half axles, further hinge means for hingedly connecting each of said two radius arms with said vehicle superstructure, spring means for springing said two half axles against said vehicle superstructure, and elastic means located above the axis of rotation of said road wheels for flexibly connecting said axle bracket to said vehicle structure such that it is capable to swing in relation to the latter about an axis extending in the transverse direction of the vehicle.

15. An axle suspension system according to claim 14, wherein said hinge means for hinging said radius arms to said half axles are located lower than the axis of rotation of said road wheels.

16. An axle suspension system according to claim 14, wherein said hinge means for hinging said radius arms to said half axles comprise elastic means.

17. An axle suspension system of a motor vehicle comprising an axle bracket connected with the vehicle superstructure, two road wheels located oppositely to each other on different sides of the vehicle, two tubular half axles each of which extends from an inner end to an outer end in the transverse direction of the vehicle, means for supporting one each of said two road wheels on the outer end of each of said two half axles, means forming only a pivotal connection enabling essentially only pivotal movement about the pivot axis thereof for hinging the inner end of each of said two half axles to said axle bracket with a common fulcrum for both half axles extending in direction of travel of the vehicle, said fulcrum being located lower than the axis of rotation of said two road wheels, an axle drive gearing incorporated in one of said two half axles independently of said axle bracket, driving means including means within said tubular half axles for driving each of said two road wheels from said axle drive gearing, said driving means further including a driving joint located intermediate the means within one of said tubular half axles and the means arranged within the other one of said tubular half axles, and sealing means for sealing said two half axles with respect to each other and for also sealing said driving joint.

18. An axle suspension system comprising an axle bracket connected with the vehicle superstructure, two road wheels located oppositely to each other on different sides of the vehicle, two half axles each extending from an inner end to an outer end in the transverse direction of the vehicle, means for supporting one each of said two road wheels on the outer end of each of said two half axles, means forming a single pivotal joint enabling essentially only pivotal movement about the pivot axis thereof for hinging the inner end of each of said two half axles to said axle bracket with a common fulcrum for both of said half axles extending in the direction of travel of the vehicle, said fulcrum being located lower than the axis of rotation of said two road wheels, an axle drive gearing incorporated in one of said two half axles independently of said axle bracket and means for driving said two road wheels from said axle drive gearing including two drive shafts, one of each of said drive shafts driving one of said wheels and one of said drive shafts being directly driven from said axle drive gearing a driving joint essentially vertically above said pivot axis connecting said axle drive gearing with the other of said drive shafts, means for supporting said one of said drive shafts in the corresponding half axle near said drive joint, and means for supporting said other drive shaft in the corresponding half axle only near the corresponding road wheel.

19. An axle suspension system comprising an axle bracket connected with the vehicle superstructure, two road wheels located oppositely to each other on different sides of the vehicle, two half axles each extending from an inner end to an outer end in the transverse direction of the vehicle, means for supporting one each of said two road wheels on the outer end of each of said two half axles, means forming a single pivotal joint enabling essentially only pivotal movement about the pivot axis thereof for hinging the inner end of each of said two half axles to said axle bracket with a common fulcrum for both of said half axles extending in the direction of travel of the vehicle, said fulcrum being located lower than the axis of rotation of said two road wheels, an axle drive gearing incorporated in one of said two half axles independently of said axle bracket, means for driving said two road wheels from said axle drive gearing including two drive shafts, one each of said drive shafts driving one of said two road wheels and one of said drive shafts being driven directly from said axle drive gearing, and a driving joint located essentially vertically above said fulcrum and connecting said axle drive gearing with the other one of said two drive shafts, said two drive shafts being coaxial with the axis of rotation of said two road wheels.

20. An axle suspension system of a motor vehicle comprising an axle bracket connected with the vehicle superstructure, two road wheels located oppositely to each other on different sides of the vehicle, two half axles each extending from an inner end to an outer end in the transverse direction of the vehicle, means for supporting one each of said two road wheels on the outer end of a corresponding one of said two half axles, means for hinging the inner end of each of said two half axles to said axle bracket with a common fulcrum extending in the direction of travel of the vehicle, said fulcrum being located lower than the axis of rotation of said two road wheels, two radius arms on either side of the vehicle, hinge means for hingedly connecting one each of said two radius arms to each of said two half axles, further hinge means for hingedly connecting each of said radius arms with said vehicle superstructure, spring means for springing said two half axles against said vehicle superstructure, elastic means located above the axis of rotation of said road wheels for flexibly connecting said axle bracket to said vehicle structure to enable swinging movement of said axle bracket relative to said vehicle structure about an axis extending in the transverse direction of the vehicle, an axle drive gearing incorporated in one of said two half axles independently of said axle bracket, and means for driving said two road wheels from said axle drive gearing including two drive shafts of which one each drives one of said two road wheels and one of which is driven directly from said axle drive gearing, a driving joint located essentially vertically above said pivot axis connecting said axle drive gearing with the other of said drive shafts, means for supporting said one of said drive shafts in the corresponding half axle near said axle drive gearing, and means for supporting said other drive shaft in the corresponding half axle only near the corresponding wheel.

References Cited in the file of this patent

UNITED STATES PATENTS

| | | |
|---|---|---|
| 1,937,653 | Haltenberger | Dec. 5, 1933 |
| 2,055,975 | Haltenberger | Sept. 29, 1936 |
| 2,105,369 | Paton | Jan. 11, 1938 |
| 2,145,670 | Tjaarda | Jan. 31, 1939 |
| 2,417,214 | Roos | Mar. 11, 1947 |
| 2,422,739 | Lewis | June 24, 1947 |
| 2,689,015 | Nallinger | Sept. 14, 1954 |

FOREIGN PATENTS

| | | |
|---|---|---|
| 562,775 | Germany | Oct. 28, 1932 |